DIGITAL STORAGE AND READOUT DEVICE

Filed Aug. 10, 1961 5 Sheets-Sheet 1

INVENTORS
WILMER C. ANDERSON
MICHAEL J. INGENITO
BY Wolfe, Hubbard, Voit & Osann
ATTYS

DIGITAL STORAGE AND READOUT DEVICE

Filed Aug. 10, 1961

INVENTORS
WILMER C. ANDERSON
MICHAEL J. INGENITO
BY Wolfe, Hubbard, Voit & Osann
ATTYS Oct. 26, 1965 W. C. ANDERSON ETAL 3,214,573

DIGITAL STORAGE AND READOUT DEVICE

Filed Aug. 10, 1961 5 Sheets-Sheet 3

INVENTORS
WILMER C. ANDERSON
MICHAEL J. INGENITO
BY
Wolfe, Hubbard, Voit & Osann
ATTYS

DIGITAL STORAGE AND READOUT DEVICE

Filed Aug. 10, 1961 5 Sheets-Sheet 4

INVENTORS
WILMER C. ANDERSON
MICHAEL J. INGENITO
BY Wolfe, Hubbard, Voit & Osann
ATTYS

DIGITAL STORAGE AND READOUT DEVICE

Filed Aug. 10, 1961

INVENTORS
WILMER C. ANDERSON
BY MICHAEL J. INGENITO
Wolfe, Hubbard, Voit & Osann
ATTYS United States Patent Office 3,214,573
Patented Oct. 26, 1965

3,214,573

DIGITAL STORAGE AND READOUT DEVICE

Wilmer C. Anderson, Greenwich, Conn., and Michael J. Ingenito, Bronx, N.Y., assignors to General Time Corporation, New York, N.Y., a corporation of Delaware
Filed Aug. 10, 1961, Ser. No. 130,672
10 Claims. (Cl. 235—92)

The present invention relates to counter circuitry for use in computation and control and more particularly to a digital storage and readout device embodying magnetic counting elements.

The magnetic counting device disclosed in Neitzert U.S. Patent 2,897,380 has the ability to receive a series of pulses at the input, to store a count equal in number to such pulses, and to produce a pulse at the output when the count reaches a predetermined number, accompanied by resetting of the counter to its zero condition. Briefly stated, this is accomplished by novel means which includes a magnetic core of saturable material, each input pulse serving to advance the core step by step toward a condition of positive saturation with means for accomplishing reset when saturation is achieved. Such devices may be adjusted for reliable operation in the decimal system and when so used are capable of storing information more efficiently and with fewer components than decimal type counters employing binary circuitry. Magnetic counters of the above type are commercially available under the trade name "Incremag" and, for convenience, such counters will be referred to as "counters of the Incremag type."

It is an object of the present invention to provide a novel storage and readout device which employs counters of the Incremag type and which is capable of making full use of the features and advantages of such counters. It is another object of the invention to provide a storage device employing counters of the Incremag type in which the count in each of the counters may be read out non-destructively, i.e., may be read out without destroying the initial condition of count.

It is a further object of the present invention to provide a digital storage and readout device which is static, as contrasted with devices having mechanically rotated magnetic drums or moving tapes, but which is more reliable than conventional static devices in that the storage is in the form of a permanent condition of magnetic flux, with the count being retained accurately in spite of momentary or persistent power failure. In this connection it is an object to provide a digital storage device which is capable of storing the count of input pulses even though large and indeterminate amounts of time may exist between successive pulses.

It is another object of the present invention to provide a digital storage and readout device which is highly flexible in operation, capable of receiving input pulses either in the form of decimally coded groups or in the form of an extended train of serially applied pulses, with accurate and continuous counting of the pulses in the series. It is, moreover, an object of the invention to provide a device having a flexible readout arrangement capable of reading out the count in the form of decimally coded pulse groups, in the form of a serial train or in the form of a time-out. It will be apparent, then, that the device flexibly permits at least four modes of operation, namely, (a) decimal coded input-decimal coded output, (b) serial input-decimal coded output, (c) decimal coded input-serial output, and (d) serial input-serial output. It is an object to provide a device of the above type which may be compactly constructed, is a self-contained unit and which is capable of switching from one mode of operation to another with a minimum of auxiliary external control components.

It is still another object of the present invention to provide a digital storage and readout device capable of operating at extremely high speed yet capable if desired, of operating at extremely slow speed as, for example, where it is desired to accumulate a count gradually over a long period of time. Because of its speed and flexibility, the device is capable of integration, as a building block, into more elaborate computers of many different types and designs without substantial modification of the latter. By way of further example, it is possible to employ the present device as an extremely accurate long term clock for the triggering of an operation at some predetermined later instant of time simply by recording a decimally coded number indicative of the time interval and by readout of accurately timed serial pulses until the total number, for which the device has been set, has been achieved.

It is one of the features of the device that it is capable of operating in the decimal system thus obviating the need for decimal-binary and binary-decimal translators at the input and output and enabling convenient integration with other decimally based apparatus. However, the present device is not limited for use in the decimal system but may be conveniently adjusted to any desired base determined only by the maximum counting capacity of the individual magnetic counters. Or, if desired, the device may be readily integrated with binary apparatus simply by changing the base of the counters to eight and by employing a three bit binary code.

It is a still further object of the present invention to provide a digital storage and readout device which is not limited to any particular number of orders but which may be easily and simply expanded to include any desired number of orders depending only upon the need and application.

Finally, it is an object of the invention to provide a novel digital storage and readout device which enables high density storage using standard components and which may therefore be constructed more economically than the storage devices now employed.

Other objects and advantages of the invention will become apparent upon reading the attached detailed description and upon reference to the drawings in which:

FIGURE 1 is a block diagram of a digital recording and readout device constructed in accordance with the present invention.

FIGS. 2 and 3 comprise a circuit diagram of the device disclosed in FIG. 1.

Figure 1:
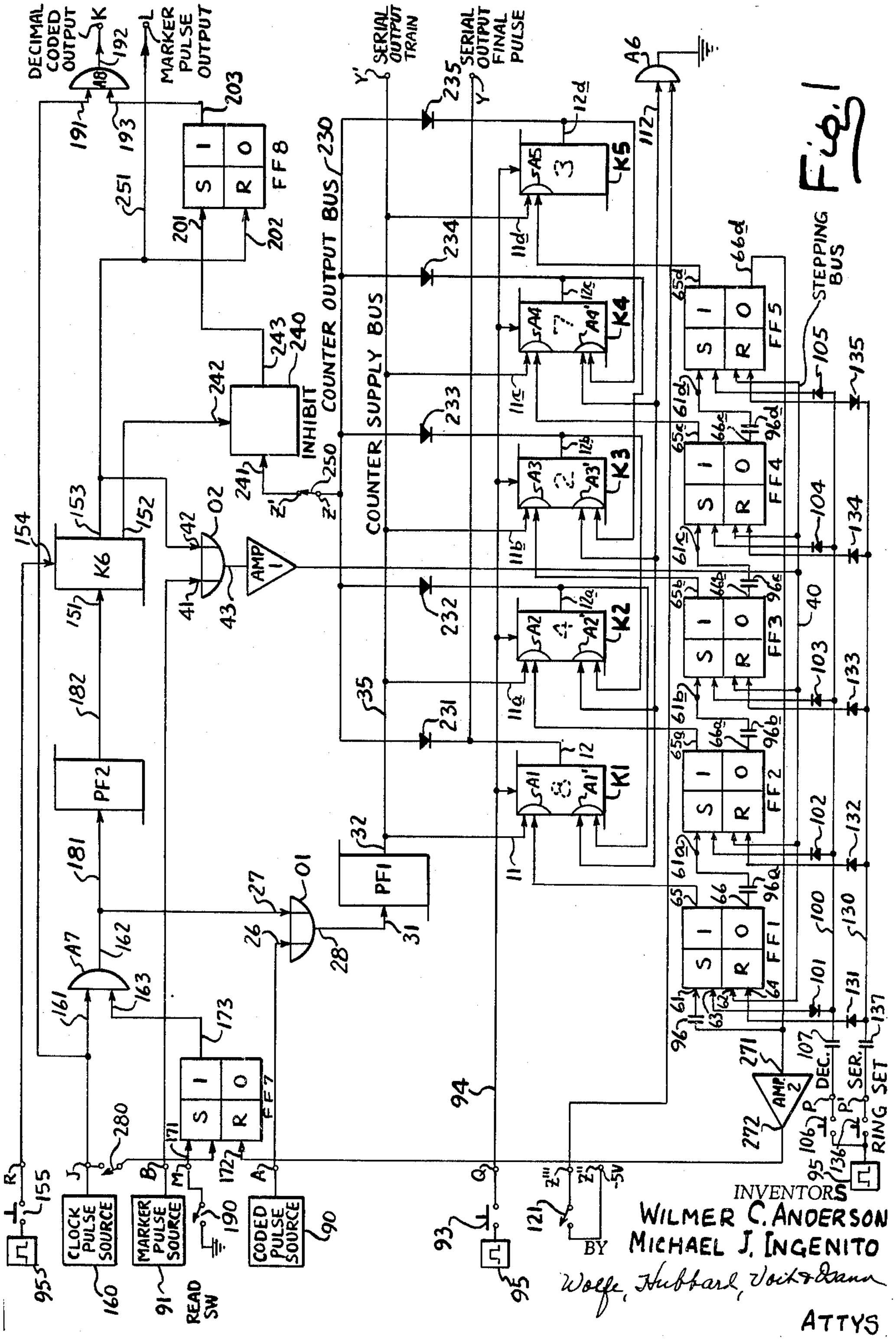

While the invention has been described in connection with a preferred embodiment it will be apparent to one skilled in the art that the invention is not limited to the particular embodiment but, on the contrary, we intend to cover the various alternative and equivalent arrangements which are included within the spirit and scope of the appended claims.

Turning now to the drawings an embodiment is disclosed which incorporates magnetic counters of the Incremag type identified as K1–K5 inclusive, cross reference being made to Neitzert Patent 2,897,380 for the details of construction and operation.

Taking counter K1 by way of example, it will suffice to say that the counter has an input terminal 11 and an output terminal 12 together with a control terminal 13 which, as will be apparent, serves to controllably gate the input. The input and control terminals are connected to the emitter and base terminals respectively of an input transistor 15 of the NPN type. For turning the input transistor to its "off" condition a bias resistor 16 is provided supplied, as will appear, from a negative voltage source. The heart of the counter is a saturable reactor 20 having an input winding 21, an output winding 22 and a triggering winding 23. A transistor 24 has its input circuit connected across the triggering winding and has its output circuit connected in series with the output winding 22. The material of the core is so chosen that when an input pulse is applied to the input winding, the magnetization in the core is advanced one step from negative saturation toward to the condition of positive saturation. Upon a total of nine pulses being applied to the input winding, assuming the counter is adjusted for decimal usage, a condition of near saturation is achieved. Thus when the tenth pulse is applied, the condition of saturation is exceeded, and, when such pulse is removed, the sudden collapse of the excess flux induces a voltage in the triggering winding 23 which is in a direction to initiate conduction in the transistor 24. The resulting flow of current in the output winding 22 not only produces an output pulse at the output terminal 12 but induces a voltage in the triggering winding 23 which causes still further current to flow through the transistor and winding 22 to the point where a condition of negative saturation is achieved in the core of the reactor. This restores the device to its initial state in readiness to receive a new series of pulses to be counted. If desired, the counter may be restored to this initial condition of negative saturation by current applied to an auxiliary winding indicated at 25. The counters K2–K5 are similarly constructed and thus the same reference numerals, with letter subscript, are applied, where required, to similar parts.

The counters are utilized to store a count in five consecutive orders with K1 storing the highest order count and K5 the lowest order. In carrying out the present invention means are provided for feeding coded voltage pulses, comprising the signal, to each of the counters K1–K5, with means for switching or commutating from one counter to the next to activate the counters in succession, order by order, during the recording or "reading in" of the input signal.

Figure 2:
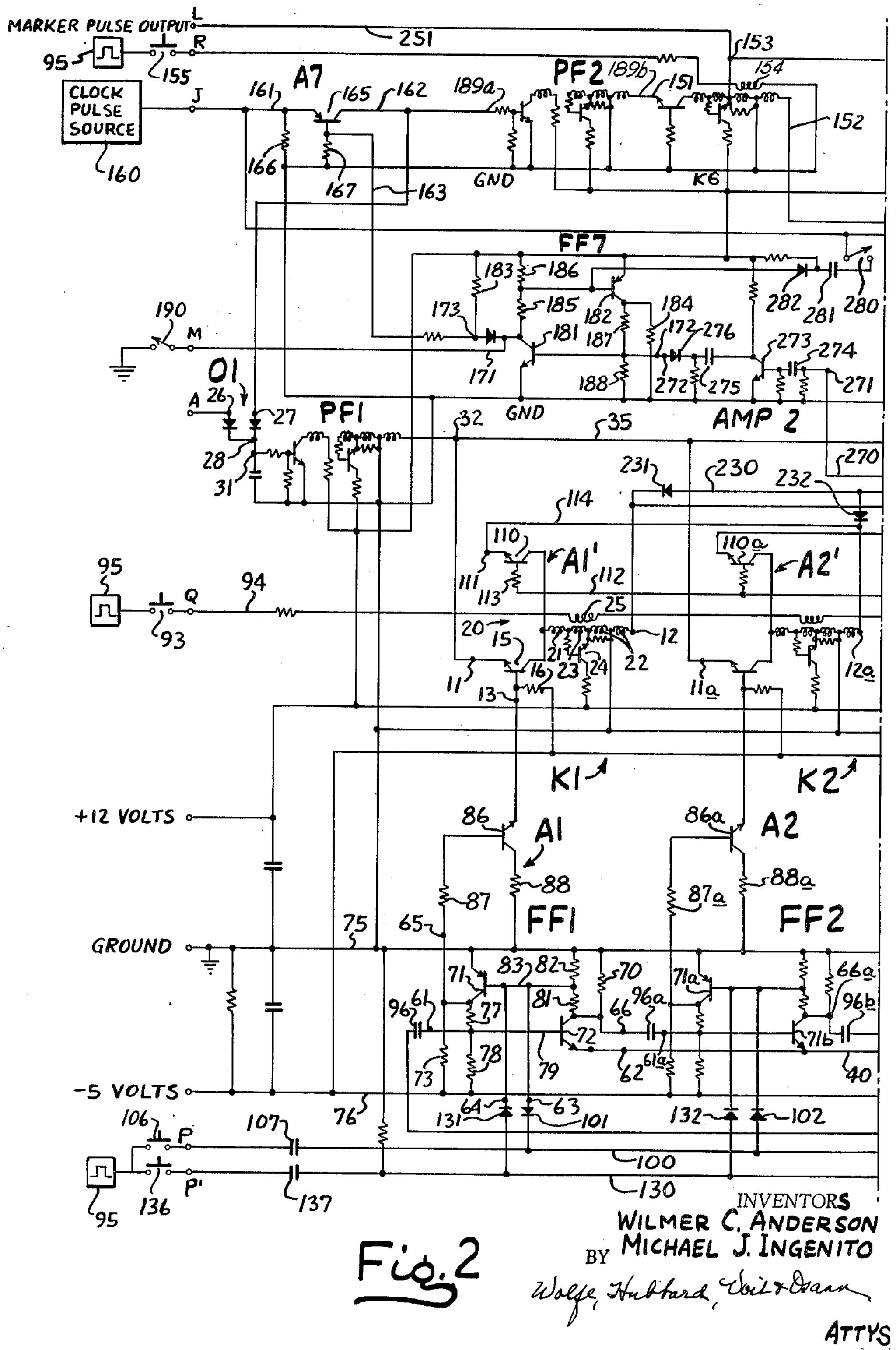

For feeding in the input signal, there is provided at the left hand side of FIGS. 1 and 2, an input terminal A. The circuit is completed to the counters through an "or" gate O1 and a pulse former PF1. The "or" gate includes a pair of diodes having input terminals 26, 27 and a common output terminal 28. The pulse former PF1, having an input terminal 31 and an output terminal 32, is preferably an Incremag type counter adjusted for a 1:1 counting ratio. The purpose of the pulse former is to insure that the input pulses are of consistent size and shape suitable for energizing the counters. The output terminal of the pulse former feeds a signal bus 35 which is connected to feed the input terminals of all of the counters.

For commutating or stepping from one of the counters to the next under the control of marker pulses, a counting ring is provided consisting of bistable flip-flop devices FF1–FF5, inclusive, so arranged that stepping occurs from one of the flip-flop devices to the next upon the arrival of each successive marker pulse and with the output pulses of the flip-flops being utilized to control "and" gates which are effectively between the signal bus 35 and the inputs of the respective counters. The "and" gate used with counter K1 has been designated A1 and the "and" gates associated with each of the remaining counters are identified as A2–A5 respectively. A counter is therefore activated, i.e., receptive to an input signal, only when the associated flip-flop device is energized.

For the purpose of controlling the flip-flop devices, i.e., for stepping from one of them to the next during the recording of a decimal coded input signal, marker pulses are applied to a marker pulse input terminal B. Such pulses flow through an "or" gate O2, are amplified in an amplifier AMP1, and are applied to a marker pulse input bus 40 which is connected to all of the flip-flop devices. The "or" gate O2, which consists of a pair of diodes, has input terminals 41, 42 and an output terminal 43. The amplifier, which has an input terminal 45 and an output terminal 46, includes a differentiating capacitor 47 and a diode 48 for deriving a negative spike which is fed to the base terminal of a transistor 50 for turning the same on. The output of the transistor is differentiated by a capacitor 51, the resulting positive spike, selected by a diode 52, being fed to the amplifier output terminal 46 and stepping bus 40.

Taking the flip-flop FF1 by way of example (FIG. 2), input terminals 61–64 are provided. As indicated by the letters "S" and "R" in FIG. 1, a signal at the input 61 is employed to "set" the flip-flop FF1, i.e., render it conductive, while the signal at the input terminal 62 is used to "reset" the flip-flop device to its non-conducting condition. The two remaining input terminals 63, 64 are used for setting and resetting to establish initial conditions as will be referred to later in the discussion. The flip-flop device FF1 has two output terminals 65, 66 which are respectively connected to the associated "and" gate and to the next flip-flop device in the ring.

While the present invention is not limited to use with any particular flip-flop circuit, the circuit which has been employed possesses a number of advantages in this environment and is hence preferred. It is of the type in which both legs of the circuit are simultaneously conductive or simultaneously non-conductive. Thus in the left hand side of the circuit there is provided a transistor 71 and in the right hand side a transistor 72. These are of the PNP and NPN types respectively and should be characterized by absence of leakage current. Connected in the load or output circuit of the transistor 71 is a load resistor 73 while the transistor 72 has an associated load resistor 70. The supply voltage, in this case −5 volts, is applied across buses 75, 76, the bus 75 being at ground potential. For the purpose of coupling the output circuit of the transistor 71 to the base or input circuit of the transistor 72, a voltage divider is provided which consists of two resistors 77, 78 having a cross connection 79. Similarly the output of the transistor 72 is coupled to the input of the transistor 71 by a voltage divider consisting of resistors 81, 82 feeding a cross connection 83.

For the purpose of resetting the flip-flop device FF1, i.e., rendering it non-conductive, the emitter terminal 62 of the transistor 72 is directly connected to the stepping input bus 40. A resistor 85, connected between the negative supply bus and the stepping input bus, causes the voltage on the latter, and hence the voltage applied to the emitter of transistor 72, to be normally more positive than −5 volts due to the voltage drop in resistor 85. It will be apparent, then, that when a positive input pulse is received at the input terminal 62, the emitter connected thereto is swung momentarily positive terminating conduction in the transistor 72. This produces a positive going voltage on the cross connection 83 connected to the base of the transistor 71 tending to reduce the conduction in the latter. This, in turn, produces a negative going voltage at the cross connection 79 which further insures cessation of current flow in the transistor 72. Since the effect is regenerative, action takes place almost instantaneously so that a very short positive spike at the terminal 62 is capable of producing non-conduction in the flip-flop device.

Conversely when a positive control pulse is received at the "set" input terminal 61, and applied to the base of the NPN transistor 72, this initiates flow through the collector circuit which causes a negative-going voltage at the cross connection 83 leading to the base of the PNP transistor 73. This in turn causes current to flow through the load circuit of the transistor to produce a positive-going voltage at the cross connection 79. The effect being regenerative, both transistors are immediately switched to their conducting states.

Turning next to the "and" gate A1 which is interposed between the flip-flop device FF1 and the counter K1 (FIG. 2), it includes a transistor 86 having an input resistor 87 and a resistor 88 in its collector circuit. The emitter of the transistor 86 is connected directly to the base of the transistor 15 in the counter K1. Consequently the transistor 86 serves as a switch which, in the open condition, allows negative bias to be applied, via resistor 16, to the base of the NPN transistor 15 in the counter, effectively turning off the latter. In its opposite or "on" condition the transistor 86 connects the base of the transistor 15 to ground via the relatively low resistance 88, thereby making the transistor responsive to the input pulses which appear at the counter input terminal 11.

Figure 4:
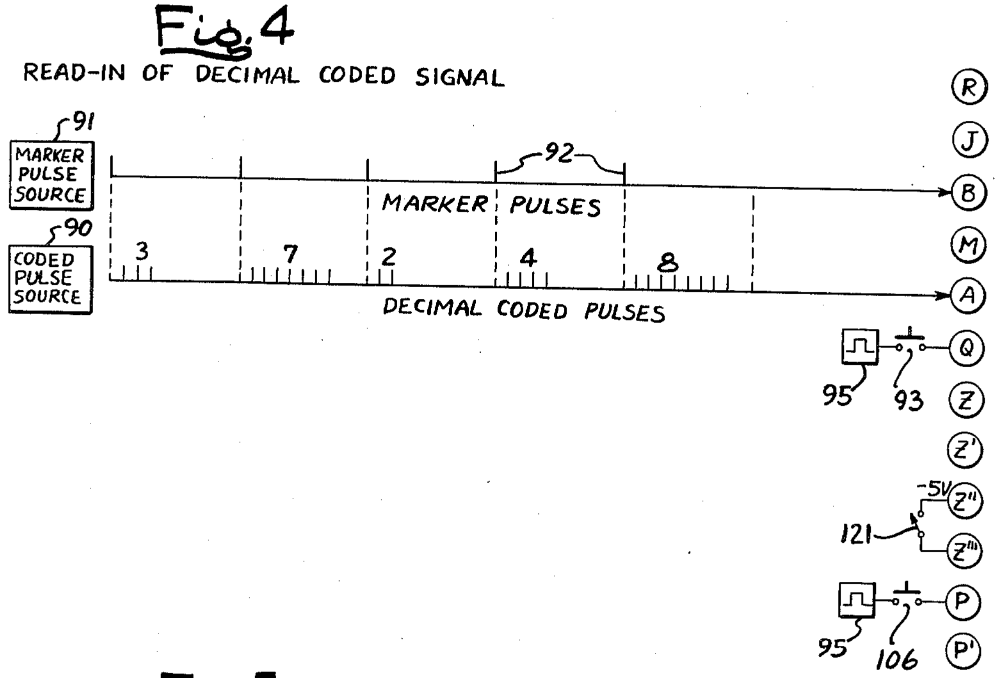
FIG. 4 is a diagram showing the control connections which are active during the reading in of a decimal coded signal.

The operation of the flip-flop device FF1, the counter K1, and the associated "and" gate A1 may be understood by considering FIG. 2 in connection with FIG. 4 which is labeled "Read-in of Decimal Coded Signal." It will be assumed, first of all, that a suitable pulse source 90 has been provided for feeding groups of decimal coded pulses into the input terminal A. It will be assumed further that a marker pulse source 91 is provided for sending in marker pulses 92 at regular intervals separating the groups of decimal coded pulses.

It will moreover be assumed that the flip-flip device FF1 is in its "reset" or non-conducting state, the circuit having been put in such state by a positive pulse applied to input terminal 62 and that the counter has been set to zero by a pulse applied to terminal Q through a momentary contact switch 93 connected to line 94 feeding the auxiliary reset winding 25. Such zero setting pulse may be derived from any suitable voltage source 95. When the flip-flip FF1 is thus non-conducting, a negative bias voltage is applied to the base of the transistor 86 of the "and" gate A1. This effectively open circuits the transistor so that negative bias is applied to the base of transistor 15 in the counter through resistor 16. Consequently such transistor is turned off so that the pulses which are applied to the counter input terminal 11 by the pulse former PF1 are ineffective.

However, when the flip-flop device FF1 is turned on by reason of a positive pulse applied at the input terminal 61, transistor 72 is biased for conduction which causes both of the transistors to be instantaneously conductive. This causes the output terminal 65 of the flip-flop device to swing in the positive direction causing the output circuit of the "and" gate A1 to be completed. This effectively connects the relatively low valve resistor 88 to the base of the transistor 15 in the counter, removing the negative bias therefrom and causing the transistor 15 to be responsive to the input pulses received at the input terminal 11.

The pulses forming the first decimally coded group, are, say eight in number. Following the series of eight pulses, a marker pulse from the source 91 is applied to the ring stepping bus 40, and thence to input terminal 62, via the amplifier AMP1. Since such pulse is of positive polarity, it turns off the transistor 72, transistor 71 also becoming non-conductive. This applies negative bias to the "and" gate A1 so that the latter is effectively open circuited, resulting in the application of negative bias to the base of the transistor 15 turning off the counter K1.

While the operation has been described in connection with only the first flip flop device, gate, and counter, it will be understood that identical circuitry is used in the successive stages. Consequently the same reference numerals have been applied, where appropriate, with an added letter subscript *a–d* in the following four stages. Each flip-flop device has its output terminal 66 conected to the input terminal 61 of the stage next in order by a capacitor 96, with the output of the final stage FF5 being coupled, as shown, to the input of the first stage thereby completing the ring. Thus upon arrival of a marker pulse, which is applied to the stepping bus 40, a positive voltage is simultaneously applied to the emitter terminals of all of the flip-flop devices 62. However, since all of the flip-flop devices except the activated one, are already in their reset or non-conducting states, the marker pulse is effective only upon the activated flip-flop device, causing it to transform from the conducting to the non-conducting state. Such change is accompanied by an abrupt step change in the output voltage which, upon differentiation by the input capacitor of the succeeding stage, results in the succeeding stage becoming conductive or "set" so that it activates the next counter in the series, thereby making the counter input terminal receptive to the input pulses received through the input terminal A.

Applying the above to the circuit shown in FIG. 2, the marker pulse following the first group of eight input pulses (see FIG. 4) turns off FF1 inactivating the first counter K2 and turns on FF2 activating the second counter K2, the succeeding counters W3, K4, and K5 being inactive. With the counter K2 activated, four pulses flow into the input terminal 11*a* thereof and are then recorded as a count. The next marker pulse applied from terminal B through the bus 40, rests the flip-flop device FF2 to its non-conducting condition which, because of the coupling through capacitor 96*b* turns on the flip-flop device FF3 thereby activating the counter K3 to receive the next group of two pulses. This process is repeated with seven pulses being recorded in the counter K4 and three pulses being recorded in the counter K5. No further input pulses are supplied to the terminals A, B so that this completes the decimal coded recording step. Having recorded the five digits comprising a five place decimal number, from high order to low order, the number within the present device and which is susceptible to later readout is 84,273.

In the above discussion of commutation from one order to the next it was assumed that the flip-flop device FF1 was "set" or conducting and that the succeeding flip-flop devices were reset or non-conducting at the outset of the recording cycle. In order to insure that this condition obtains, a first "ring set" bus 100 is provided having diodes 101 to 105 inclusive connected to the auxiliary input terminals 63 of the flip-flop devices. The ring set bus 100 is connected to the input terminal P which is connected to the square wave source 95 through a momentary contact maker 106 which may be in the form of a pushbutton. For the purpose of differentiating the input pulse to form positive and negative spikes, a series capacitor 107 is used. It will be noted that the diode 101 is faced opposite to the diodes 102–105. Consequently, the negative spike flowing through the diode 101 is effective to cause the flip-flop device FF1 to become conductive whereas the positive spikes fed through the diodes 102–105 insure that the remaining flip-flop devices remain non-conductive and hence inactive. In short, ring set terminal P is energized as may be necessary to condition the circuit for decimal coded operation.

*Read-in of serial signal*

In accordance with the present invention, the circuit is not limited to the reading in or recording of a decimally coded signal but is equally capable of recording any desired serial train of input pulses within the counting capacity of the five decade stages. To accomplish this, a switching means is interposed between the successive counters for connecting them into a chain and with provision for feeding the input signal exclusively into the counter of lowest order. Thus there is interposed between the second to highest order counter K2 and the highest order counter K1 a switch in the form of an "and" gate A1′. This "and" gate includes a transistor 110 having an input terminal 111 and having its base connected to a bias control bus 112 via a resistor 113.

Figure 3:
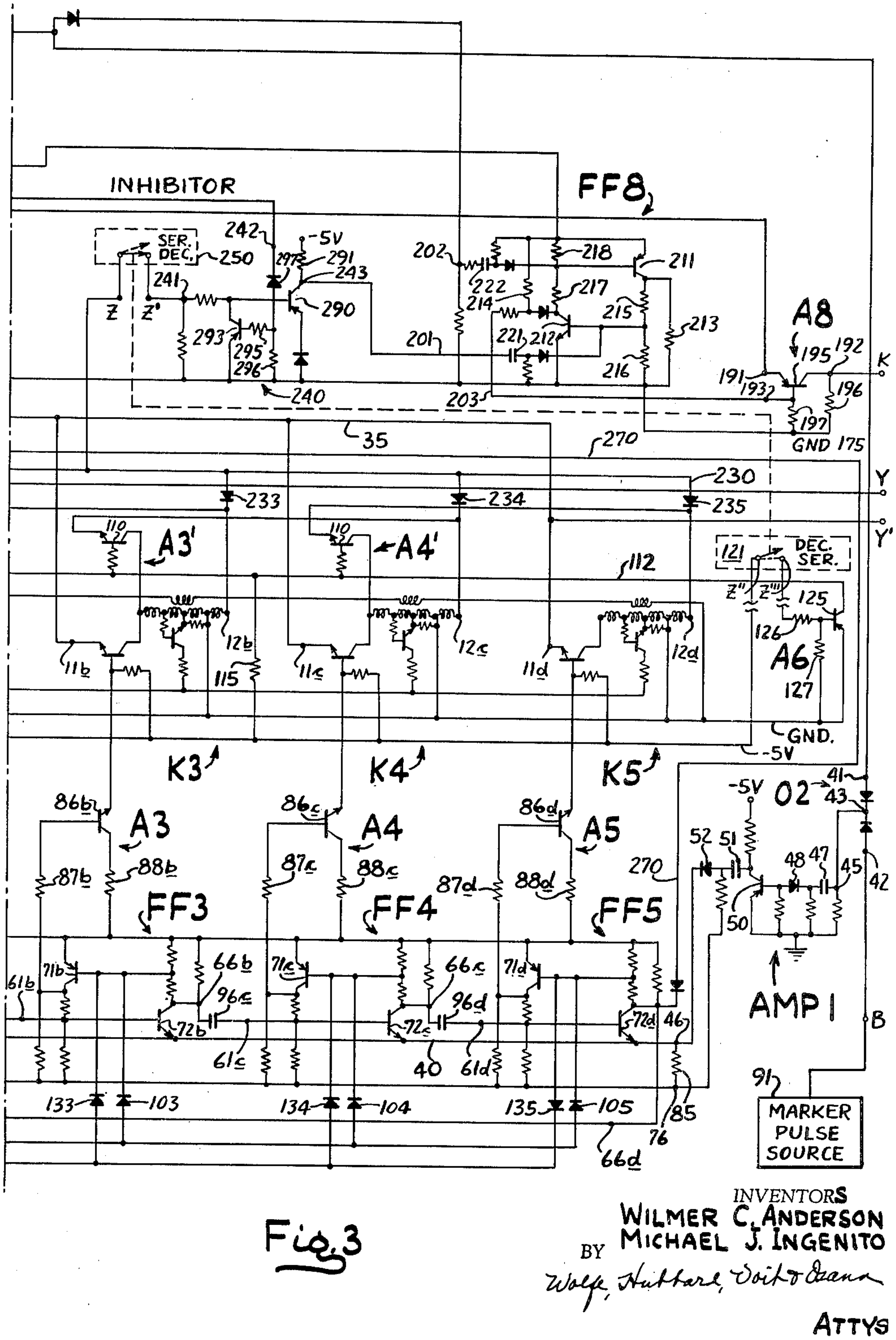

The input terminal 111 of the transistor, in this case the emitter, is fed from the output terminal of the counter K2 of next lower order via a line 114. The collector terminal is connected to the input coil 21 of the counter K1. The bias control bus 112 is connected to —5 volts through resistor 115 (FIG. 3). As long as the bias control bus 112 is not connected to ground through conduction of transistor 125 the transistor 110 is biased so that conduction cannot take place through its emitter collector circuit. Thus under conditions of decimal recording described above the successive counters are isolated from one another. However, upon grounding the bias control bus 112 through transistor 125, the emitter-collector circuit of the transistor 110 is effectively closed which serves to interconnect the adjacent counter stages.

Figure 5:
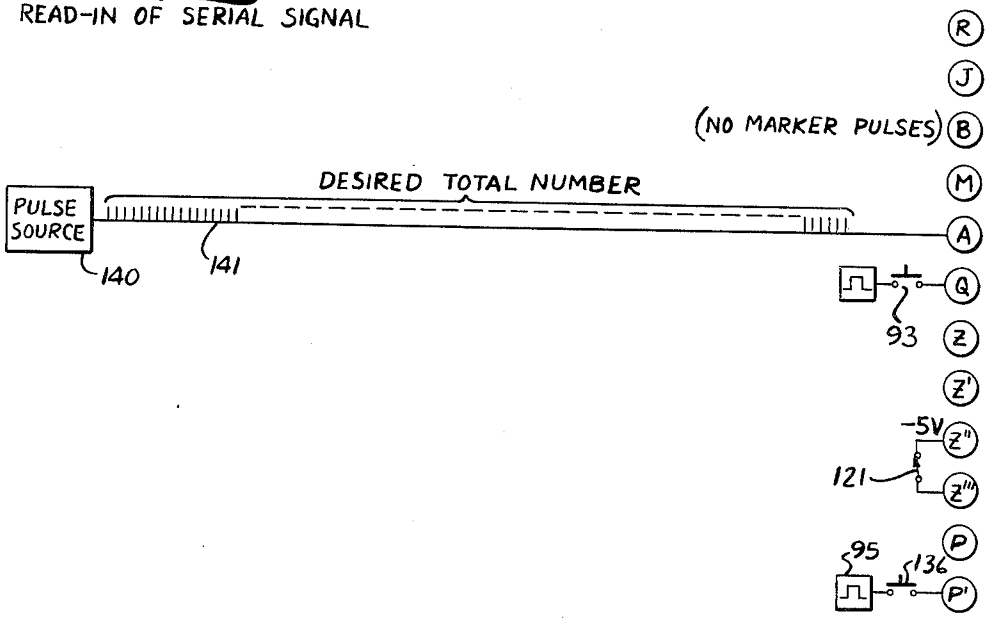
FIG. 5 is a diagram showing the control connections employed for the reading in of a serial train.

For the purpose of enabling the control bus 112 to be selectively grounded, a modified "and" gate or switch A6 is provided having a control terminal controlled by a series switch 121. Included within the gate is transistor 125 having its collector connected to the bus 112 and its emitter grounded. The base of the transistor 125 is connected to the midpoint of a voltage divider consisting of resistors 126, 127. The resistor 127 is grounded, as shown, and the resistor 126 is connected to the switch 121 leading to the —5 volt bus. It will thus be apparent that when the circuit is employed in its coded decimal mode, and with the switch 121 open, the base of the transistor 125 is effectively connected to ground so that the transistor is open circuited, with the result that the bias control bus 112 is at —5 volts and hence ineffective to turn on the "and" gates A1′–A4′. However, for serial operation the switch 121 is closed (see FIGS. 3 and 5). This biases the transistor 125 negatively so that it interposes an effective low resistance between the bus 112 and ground. Under such conditions the transistors in the "and" gates A1′–A4′ are all turned on closing a serial recording chain which includes all of the counter K1–K5.

For the purpose of activitating only the counter K5 of lowest order during serial operation, means are provided for setting, or making conductive, only the flip-flop device FF5 and for resetting all of the flip-flop devices FF1–FF4. This is accomplished by providing a second ring set bus 130 having diodes 131–135 respectively connected to the input terminals 64 of the successive flip-flop devices. The ring set bus 130 is connected to an input terminal P′ which is connected to a current source 95 through a switch 136, a capacitor 137 being interposed in series. Thus where a square wave pulse is applied to the terminal P′ the resulting negative spike is applied to the base terminal of the PNP transistor in the flip-flop device FF5. This causes the transistor to become conducting which induces conduction in the companion transistor **72*d*. As a result the "and" switch A5 is turned on activating the input terminal of the counter K5 so that it receives serial pulses orginating from the input terminal A. Conversely, since only positive pulses can pass through the diodes 131–134**, the flip-flop devices FF1–FF4 remain turned off and their associated counters K1–K4 are unresponsive to the serial input train.

Therefore in operation the pulses 141 received through terminal A from a pulse source 140 are applied to the input terminal of the counter K5 until ten pulses have been counted. When this occurs the counter K5 resets itself to zero accompanied by production of an output pulse which is fed to the input of the counter K4 of next higher order via the "and" gate A4′. In due course the counter K4 reaches its capacity count of ten and in turn produces an output pulse which is fed to the counter K3 of next higher order via the "and" gate A3′. For a total of 84,273 pulses to be recorded, the number in the previous example, requires that that number of pulses serially flow through the input terminal A. This will consume considerably more time than where such pulses are decimally recorded as in the previous mode of operation. However, since the present device is capable of high speed operation on the order of 100 kilocycles per second, even the recording of a long serial train is practical. The counting of such high numbers is necessary in various branches of technology as, for example, counting the output pulses of a Geiger counter. The pulses received through the input terminal A may occur either regularly spaced or with slow random timing. Accurate count is assured in either event.

*Non-destructive readout of decimally coded signal*

In the preceding sections attention has been given to use of the circuit for the recording of a decimally coded input signal or a serial train. In the present section a third and particularly important mode of operation of the device will be described in which the number recorded order by order in the counters K1–K5 may be effectively read out at an output terminal in the form of decimally coded groups of pulses separated by marker pulses to define the successive orders, while leaving the original number intact in the counters for the successive reading operation.

In accordance with the present invention a reference counter is provided together with means for simultaneously feeding recurring pulses into the reference counter and an activated one of the storage counters, with the output terminal being gated open for production of output pulses when the storage counter is full and closed when the reference counter is full to produce at the output a number of pulses equal to the number stored in the storage counter. Moreover, means are provided for terminating the feeding of pulses from the source to the storage counter when the reference counter is full so that, at the end of the cycle, the storage counter is restored to its original condition of count.

In the present device the reference counter indicated at K6 is of the type disclosed in the above mentioned Neitzert patent having an input terminal 151, a first output terminal 152 and a second output terminal 153. The device includes an auxiliary resetting coil 154 to which current is supplied from a terminal R from a suitable source 95 and through an interposed pushbutton or the like 155. The reference counter K6 is adjusted to have the same count as the storage counters K1–K5 with which it is to be used.

For the purpose of supplying clock pulses to the input terminal 151 of the reference counter, a source of clock pulses 160 is provided connected to terminal J. The source 160 may be any suitable source of regularly spaced pulses. To gate the flow of pulses an "and" gate A7 is used having an input terminal 161, an output terminal 162 and a control terminal 163. Such "and" gate includes a PNP transistor 165 having an input resistor 166 and a bias resistor 167 causing the gate to be normally nonconducting.

In order to turn on the gate A7 for flow of clock pulses a flip-flop device FF7 is used having a setting terminal 171, a resetting terminal 172 and an output terminal 173. This flip-flop device is similar to devices previously described. It includes a first transistor 181 and a second transistor 182 having load resistors 183, 184 respectively. A cross connection from the load circuit of the first transistor is made by a voltage divider 185, 186, with the center tap being connected to the base of the transistor 182. A second cross connection is provided by a voltage divider comprising resistors 187, 188, with the center tap being connected to the base of the transistor 181. For the purpose of setting the flip-flop device FF7 to turn the "and" gate A7 on, a "read" switch 190 is provided connected to terminal M. It will be noted that this switch is in parallel with the output circuit of the transistor 181. When the switch is closed, the conduction induced in resistors 185, 186 causes the transistor 182 to conduct so that the flip-flop FF7 becomes "set." This removes reverse bias at the base of the transistor 165 in the "and" gate A7 so that the wate is turned on for flow of clock pulses.

The means for resetting the flip-flop FF7 for turning off the "and" gate A7 will be discussed at a later point.

The output terminal 162 of the "and" gate A7 has two branches. The first or vertical branch feeds into the input terminal 27 of the "or" gate O1. Consequently, clock pulses flow through the pulse former PF1 and into the input terminals of the counters K1–K5, it being kept in mind, however, that only one of the counters is activated to receive the clock pulses at a given time and with the counter K1 of highest order being the first to be activated. Completing the circuit between the "and" gate A7 and the reference counter K6 is a pulse former PF2 having an input terminal 189*a* and an output terminal 189*b*. The pulse former PF2 is identical to the pulse former PF1 previously described, consisting of an Incremag type counter adjusted for a 1:1 ratio.

It will be apparent that as a result of closing the "read" switch 190 thereby setting the flip-flop FF7, the "and" gate A7 is turned on to feed clock pulses simultaneously to the reference counter K6 and to the storage counter K1.

In carrying out the invention, output clock pulses are produced at the output terminal K only after the active storage counter is filled. Consequently, to control the feeding of the pulses from the terminal K an output "and" gate A8 is used having an input terminal 191, an output terminal 192 and a control terminal 193. The gate includes a transistor 195 having a load resistor 196 and a bais resistor 197. The bias applied to the base of the transistor 195 is such that the transistor is non-conducting and the gate effectively turned off. It will be apparent therefor that the clock pulses flowing through the line which connects the terminal J with the input terminal 191 of the gate will be normally ineffective to produce an output signal.

For the purpose of biasing the gate A8 for conduction, a flip-flop device FF8 is employed having a setting input terminal 201, a resetting input terminal 202 and an output terminal 203. The device includes a first transistor 211 and a second transistor 212 having load resistors 213, 214 respectively. A first cross connection is made by means of a voltage divider having resistors 215, 216 and a second cross connection is made by a voltage divider made up of resistors 217, 218.

To provide a positive spike to initiate conduction in the transistor 212 of FF8, a differentiator 221 is provided which includes a capacitor and an associated forwardly facing diode interposed between the input terminal and the transistor base. A similar differentiator 222 is interposed between the reset input terminal 202 and the base of the transistor 211. It will be apparent from what has been stated that applying an input pulse to the input terminal 201 sets the flip-flop device FF8 for conduction, removing reverse bias at the base of the transistor in the "and" gate A8.

In order that the flip-flop FF8 may be set by any active one of the counters K1–K5, all of the counters are connected to a counter output bus 230 and to prevent interaction between the counters they are isolated by respective diodes 231–235 which are respectively connected in series with the counter output terminals. The counter output bus 230 is coupled to the setting terminal 201 of the flip-flop device FF8. However, in accordance with one of the aspects of the invention, this coupling is done through an inhibiting or coincidence device 240 having a first input terminal 241, a second input terminal 242 and an output terminal 243. Also interposed in series with the inhibiting device is a switch 250 having terminals Z–Z′ which is closed for coded decimal readout but open for serial readout. While the inhibiting device is important to the operation, nevertheless, for the sake of simplicity, discussion of it may be deferred until a later point. It may be assumed for the present that the device provides a simple connection between the input terminal 241 and the output terminal 243 so that the presence of a pulse on the counter output bus 230 is effective to set the flip-flop device FF8 for production of output pulses at the output terminal K.

In the discussion thus far, means have been described for turning on the output "and" gate when the first counter K1 has been filled to capacity with pulses originating in the clock 160. Thus assuming that the first counter has a count of eight pulses, it will be apparent that only two clock pulses are necessary in order to cause a pulse at the output of the counter. Such output pulse, flowing through the counter output bus 230, is applied to the input terminal 201 of the flip-flop device thereby to turn on the output gate to initiate flow of clock pulses at output terminal K.

In carrying out the present invention means are provided for responding to the filling up of the reference counter K6 to terminate the flow of clock pulses from the output terminal K and to produce commutation from one storage counter to the storage counter in the next order so that the process may be repeated to produce a second coded group of output pulses. To accomplish this, the output terminal 153 of the reference counter K6 is connected, as shown, to the input reset terminal of the flip-flop device FF8. Moreover, the output terminal 153 of the reference counter is connected to the input terminal 42 of the "or" gate O2, with the pulse being amplified in amplifier AMP1 previously described and applied to the stepping bus 40 associated with the flip-flop devices FF1–FF5. Moreover, the output terminal 153 of the reference counter is connected to marker pulse output terminal L via a line 251 to produce marker output pulses interposed between the coded decimal groups.

Figures 6, 7:
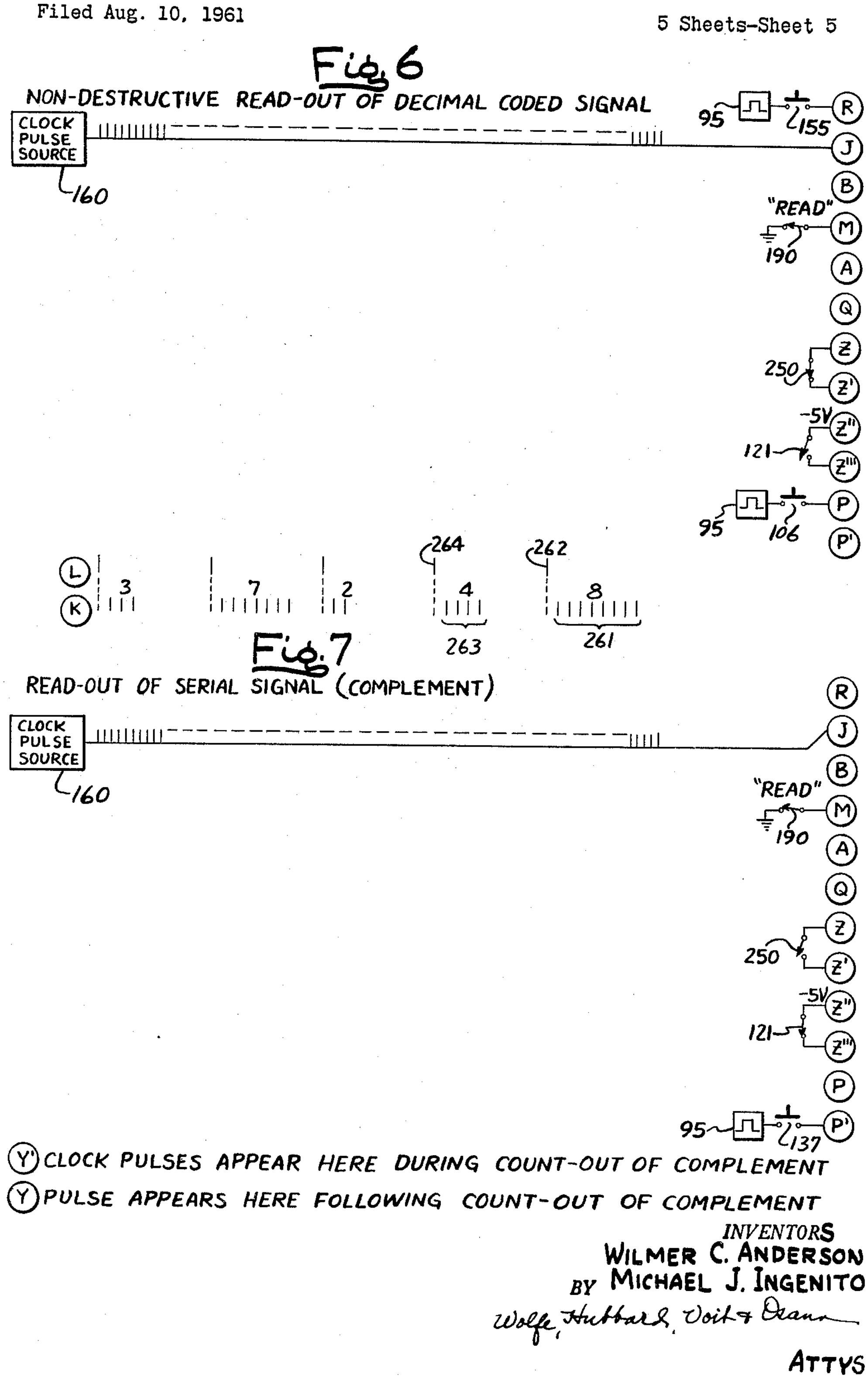
FIG. 6 is a diagram showing the control connections for the reading out of a decimal coded signal.
FIG. 7 is a diagram showing the control connections for the reading out of a serial train.

The operation of the readout arrangement may be made clear with the above in mind and upon reference to FIG. 6 which shows the controls used to condition the device for decimal coded readout. It will be assumed, first of all, that the switch 106 associated with the ring set bus 100 is momentarily closed, thereby setting the first flip-flop device FF1 for conduction and activating the first counter K1. The switch 121 is opened thereby to open the "and" gate A6 and the disable the "and" gates A1′–A4′ breaking the chain connections between the counters. It will be recalled that such connections are only required for serial operation. The switch 250 which couples the counter output bus 230 to the output flip-flop device FF8 is closed. The reference counter K6 is assumed to be in a zero count condition to which it is normally returned at the end of the storage operation. The final step is to close the "read" switch 190.

Upon closure of the "read" switch the flip-flop device FF7 is set for conduction. This produces a voltage at the output terminal 173 which, applied to the "and" gate A7, causes the latter to be conductive so that clock pulses are conducted through the "or" gate O1, the pulse former PF1, and into the counter supply bus 35. Since only the counter K1 is active, the clock pulses will flow into the counter but will have no effect upon the other counters K2–K5.

Since it is assumed that the counter K1 has an initial count of eight, which it is desired to read, it will be apparent that only two pulses will be required to complete the count and to produce a pulse at its output. This output pulse, flowing into the counter output bus 230 through the switch 250 and inhibiting device 240, is applied at the input terminal 201 of the output flip-flop device FF8, causing it to become conductive. This turns on the output gate A8 so that the third and succeeding output pulses appear at the output terminal K. At this point in the operation it is important to keep in mind that the reference counter K6 has a count of two already contained in it while the storage counter K1 is empty.

As a result eight pulses are counted out at the output terminal K, at the same time the count in the storage counter K1 goes from zero to eight and in the reference counter K6 from two to ten. Upon achieving the tenth count in the reference counter an output pulse is produced at the output terminal 153. This is applied to the reset terminal 202 of the output flip-flop device FF8 causing it to be non-conductive and turning off the output gate A8. Simultaneously, the output pulse from the reference counter K6 appears at the marker pulse output terminal L. Referring to FIG. 6, the initial group of eight pulses is indicated at 261 and the following marker pulse is indicated at 262.

At the same time that the eight pulses are fed to the output terminal K, eight pulses are fed into the first counter K1 and rerecorded therein as a count of eight. Following such recording, counter K1, is turned off as covered in the following paragraph. Thus the count which was initially in the first counter is restored and the readout, accordingly, is non-destructive.

The output pulse from the reference counter K6 not only serves to turn off the count at the output but also serves to step from the first flip-flop device FF1 to the second FF2 in the counting ring. This is accomplished by the fact that the output pulse at output terminal 153, passing through the "or" gate O2 and the amplifier AMP1, is applied to the stepping bus 40. Thus a resetting pulse is applied to terminal 62 of flip-flop FF1 causing it to switch from its conducting to its non-conducting states. The same resetting pulse is applied to the flip-flop devices FF2–FF5 but has no effect upon them since they are already in their non-conducting states. The change of state which occurs in the flip-flop device FF1 produces a voltage at the output terminal 66 which, upon differentiation by the coupling capacitor 96*a*, applies a setting voltage to the terminal 61*a* of the flip-flop FF2 turning it on and hence activating the associated counter K2.

The operation above described is then repeated with respect to the counter K2. That is to say, pulses from the clock begin to flow into both the reference counter, which is empty, and the second storage counter, which has a count of four. After six pulses have flowed into the storage counter it is full, producing an output pulse which flows through the counter output bus 230 and into the set terminal of the output flip-flop FF8 turning on the gate A8. When the gate is turned on the reference counter K6 has a count of six pulses. Thus upon adding four more pulses, during which time four pulses appear at the output (see 263 in FIG. 5) and four pulses are rerecorded in the counter K2, the reference counter K6 is full and fires, resetting the flip-flop FF8 turning off the output and producing a second reference pulse 264. The output pulse from the reference counter appears at output terminal L as a marker pulse 264. In a similar fashion the storage counters K3, K4 and K5 are commutated into activity to produce decimal coded groups of 2, 7 and 3 respectively at the output separated by marker pulses and with the counts of 2, 7 and 3 being rerecorded.

Means are provided for turning off the clock pulses once the digit of lowest order has been read. This is accomplished by coupling the output terminal 66*d* of the flip-flop device FF5 of lowest order with the reset terminal of the flip-flop FF7 via a termination line 270. Interposed in the line 270 is an amplifier AMP2 having an input terminal 271 and an output terminal 272. The amplifier includes a transistor 273 having a defferentiating capacitor 274 in series with the input. For the purpose of deriving a negative spike for terminating conduction in the flip-flop device FF7, a differentiator 275 together with a series diode 276 is included in the output. Thus following final readout the flip-flop FF7 is turned off which acts to turn off the "and" gate A7 terminating the flow of clock pulses into the system.

Where it is desired to provide repetitive cycling of the readout for continuous display, means are provided for maintaining the flip-flop device turned on so that the "and" gate A7 continues to feed clock pulses into the system. In the present instance this is accomplished by a switch 280 (see FIG. 2), one side of which is connected to the terminal J carrying the clock pulses and the other side of which feeds into a differentiator 281 having a series diode 282 for deriving a negative pulse for applying to the base terminal of the transistor 182 in flip-flop FF7.

In accordance with one of the aspects of the invention means are provided for inhibiting operation of the output flip-flop FF8 so as to avoid an indeterminate condition which arises when one of the counters has a zero stored therein at the time of readout. Where the stored number is greater than zero no problem arises since setting of the flip-flop FF8 will always take place prior to resetting. However, when the stored number is zero an output pulse will appear at the output terminal of the active storage counter at the same time that an output pulse appears at the output terminal of the reference counter. Thus the flip-flop FF8 might or might not be set and, if set, might or might not be turned off. Thus if the set pulse arrives slightly behind the reset pulse there is a possibility that ten pulses will appear at the output terminal K. Accordingly, means are provided for preventing a setting pulse from flowing from the counter output bus to the flip-flop FF8 whenever there is a coexisting pulse in the output line of the counter K6. The inhibitor 240 includes a transistor 290 having its base coupled to the input terminal 241 and its collector connected to the output terminal 243 leading to the flip-flop. A load resistor 291 is in series with the collector. To prevent any flow of a set pulse in the presence of a reset signal, a second or shorting transistor 293 is provided. The base terminal of the transistor 293 is provided with base resistors 295, 296 and a series diode 297 which is fed from the terminal 152 of the reference counter. Thus in the presence of an output from the reference counter, negative bias is applied to the base of the transistor 293, which is type PNP, causing the load resistance of the transistor to drop sharply effectively short circuiting the set pulse applied to the input terminal 241, preventing the set signal from being applied to the flip-flop FF8. While it is true that such short circuiting occurs whenever there is an output from the reference counter K6, this does not interfere with the normal operation of the device since it occurs at a time when the flip-flop FF8 is being reset and when no set pulse is flowing.

It is one of the features of the present device that readout occurs with extreme rapidity. Assuming that magnetic counters are employed having a speed of say 100 kilocycles per second and considering that fifty clock cycles are required to produce readout of a five digit number, it will be apparent that complete readout may be effected in an interval on the order of one two-thousandths of a second. This is fast enough to keep step with computers of advanced design.

*Readout of serial signal (complement)*

One of the novel uses for the present device is as an accurate long term clock capable of causing an event to take place following a predetermined time interval. Reference is made to FIG. 7 for the control settings employed in this mode of operation. It will be assumed first of all that an event is to take place at 15,727 units of time following a certain reference time. The unit of time is arbitrary and may, for example, be one one-hundredth of a second. A clock 160 of this interval is accordingly connected to the clock input terminal J. Using the settings described above in connection with FIG. 4 entitled "Readin of Decimal Coded Signal," the decimal number 84,273, being the complement of 15,727, is recorded in the clocks K1–K5. The flip-flop ring is set for serial operation by applying momentary voltage to terminal P' from a source 95. The switch 121 is closed which turns on the gates A1'–A4' to connect the counters into a chain. The switch 250 is opened. Finally, the "read" switch 190 connected to terminal M is closed which sets the flip-flop FF7 and turns on the clock gate A7 so that pulses flow into the counter supply bus 35. Since the flip-flop FF5 is the only one turned on and the counter K5 the only one activated, pulses begin to flow into the counter K5, the moment of closure of the "read" switch being the point of time reference.

Since the counters K1–K5 are, by reason of closure of the switch 121, connected as a chain, the filling up of the counter K5 in lowest order produces a carry to the next higher order, with the process being repeated for the successively higher orders until a total, in the present example, of 15,727 units of time have elapsed. The production of an output pulse at the output terminal 12 in the highest order, which signals termination of the timed interval, produces an output pulse at the serial output terminal Y which is used to actuate associate apparatus. It will be apparent from the above teachings that, if desired, full serial count-out may be achieved by providing an output terminal Y' connected to the counter supply bus 35. The serial pulses from terminal Y' may be fed through an "and" gate controlled by a flip-flop which is connected for triggering to terminal Y, thereby to terminate the feeding out of pulses from the terminal Y' at the end of the interval when the counters are full.

While the invention has been described in connection with a decimal device having five orders, it will be apparent to one skilled in the art that the device may be expanded to accommodate any desired number of orders by adding additional counters and their associated flip-flop commutating devices, a matter well within the skill of the art.

The device is well suited for use in the decimal system since it can be constructed economically with fewer components than would be required for binary storage of decimal digits. When used in the decimal system, the device may be readily integrated with conventional decimal equipment at both the input and output without necessity for decimal-binary or binary-decimal translation.

While the speed is inherently high it is an equally important feature of the present device that it is capable of responding reliably to input pulses received at long and irregular intervals. The power drain under standby conditions is only a small fraction of that required by conventional storage and readout apparatus. The above, combined with the high degree of flexibility and reliability of the device, makes it eminently suited for use in satellites or in other remote devices requiring read-in and readout for telemetering and the performance of various functions. It will be apparent to one skilled in the art that under such circumstances the various conditioning and mode switches shown in FIGS. 4–7 may be remotely operated.

We claim as our invention:

1. In digital readout apparatus for producing a series of time spaced signals corresponding to a stored numerical value, the combination comprising a storage counter and a reference counter, each of said counters being of the type capable of storing a count and for producing an output pulse when a predetermined count is achieved, means for conditioning said storage counter initially to store a number not exceeding said predetermined count, means for conditioning said reference counter initially to store a count of zero, a source of recurring pulses, means for coupling said source to both of said counters, an output terminal, means for effectively connecting said source to said output terminal in response to an output pulse from said storage counter, and means for disconnecting said source from said output terminal in response to an output pulse from said reference counter so that pulses appear at said output terminal corresponding in number to the number initially stored in said storage counter.

2. In a digital readout device for producing a group of pulses corresponding to a stored numerical value, the combination comprising a storage counter and a reference counter, said counters being of the type capable of storing a count of input pulses and capable of automatic reset accompanied by an output pulse when a predetermined count is achieved, the output terminal having an associated gate, a source of pulses connected to the gate for feeding pulses to the output terminal when the gate is turned on, means for feeding pulses from said source to said storage and reference counters simultaneously, means for coupling said gate to the counters so that the gate is turned on in response to an output pulse from the storage counter and turned off in response to an output pulse from the reference counter so that pulses are produced at the output terminal in a number corresponding to the count stored in the storage counter.

3. In a digital readout device for producing a group of pulses corresponding to a stored numerical value, the combination comprising a storage counter and a reference counter, said counters being of the type capable of storing a count of input pulses and capable of automatic reset accompanied by an output pulse when a predetermined count is achieved, an output terminal having an associated gate, a source of pulses connected to the gate for feeding pulses to the output terminal when the gate is turned on, means for feeding a train of pulses from said source to said storage and reference counters simultaneously, means for coupling said gate to the counters so that the gate is turned on in response to an output pulse from the storage counter and turned off in response to an output pulse from the reference counter so that pulses are produced at the output terminal in a number corresponding to the count stored in the storage counter, and means for restoring the original count in the storage counter.

4. In digital readout apparatus for producing a series of time spaced groups of pulses representing, order by order, a stored numerical value, the combination comprising a plurality of storage counters and a reference counter, each of said counters being of the type capable of storing a count and for producing an output pulse accompanied by resetting of the counter when a predetermined count is achieved, means for establishing a count in each of said counters, commutating means for activating the counters in succession, means for conditioning said reference counter initially to store a count of zero, a source of recurring pulses, means for coupling said source to said reference counters and to the activated storage counter, and output terminal, means for effectively connecting said source to said output terminal in response to an output pulse from said storage counter, and means for effectively disconnecting said source from said output terminal and for triggering said commutating means in response to an output pulse from said reference counter so that pulses appear at said output terminal corresponding in number to the number initially stored in said storage counter.

5. A device for digital storage and readout comprising, in combination, a reference counter and a plurality of storage counters representing successive numerical orders, said counters being of the type capable of receiving and storing input pulses for production of an output pulse accompanied by resetting when a predetermined count is achieved, means for connecting the storage counters together in a chain, an input terminal connected to the storage counter of lowest order for receiving a series of pulses with the total number of pulses being at all times registered order by order in said storage counter, means for effectively disconnecting the storage counters from one another, an output terminal having an associated gate, a source of pulses connected to the gate for feeding pulses to the output terminal when the gate is turned on, commutating means for said storage counters to activate the storage counters in succession order by order, means for feeding pulses from said source to said reference counter and to the activated one of said storage counters, means for controllably coupling the reference counter and the activated storage counter to the gate so that the gate is turned on when the activated storage counter becomes filled and so that the gate is turned off when the reference counter is filled so that pulses appear at the output terminal in a group corresponding in number to the original condition of count in the activated storage counter, and means responsive to the filling of the reference counter for stepping the commutating means to deactivate the storage counter to preserve the original count therein and to activate the storage counter of adjacent order.

6. A readout arrangement for a digital storage device comprising in combination a plurality of storage counters representing successive orders, a reference counter, said counters being of the type capable of receiving and storing input pulses for production of an output pulse accompanied by resetting of the counter when a predetermined count is achieved, an output terminal having an associated gate, a source of pulses connected to the gate for feeding pulses to the output terminal when the gate is turned on, commutating means including ring connected flip-flop devices individually associated with said storage counters to commutate the latter from order to order for activation in succession, means for feeding pulses from said source to said reference counter and to the activated one of said storage counters, means for coupling storage counters to the gate so that the gate is turned on when the activated storage counter is filled with complementary pulses, means for coupling said reference counter to the gate so that the gate is turned off when the reference counter has been filled with pulses so that pulses appear at the output terminal in a group corresponding in number to the original condition of count in the activated storage counter, and means responsive to the full condition of the reference counter for commutating to the storage counter next in order for activating the same.

7. A device for digital storage and readout comprising, in combination, a reference counter and a plurality of storage counters representing successive numerical orders, said counters being of the type capable of receiving and storing input pulses for production of an output pulse when a predetermined count is achieved, commutating means for said storage counters to commutate them from order to order so that each storage counter is activated in succession, an input terminal for feeding said storage counters with separate groups of pulses, means for stepping the commutating means between said groups of pulses so that each storage counter has a count stored therein corresponding to the number of pulses which it receives, a source of recurring clock pulses, means for coupling said source to said counters, an output terminal, means for effectively connecting said source to said output terminal in response to an output pulse from the activated one of said storage counters, and means for disconnecting said source from said output terminal as well as stepping said commutating means in response to an output pulse from said reference counter for producing at said output terminal groups of pulses corresponding to the count stored in the successively activated storage counters.

8. A device for digital storage and readout comprising in combination a reference counter and a plurality of storage counters representing successive numerical orders, said counters being of the type capable of receiving and storing input pulses for production of an output pulse when a predetermined count is achieved, commutating means for said storage counters to commutate them from order to order so that each storage counter is activated in succession, an input terminal for feeding said storage counters with groups of pulses separated by marker pulses, means actuated by the marker pulses for stepping the commutating means between said groups of pulses so that each storage counter has a number stored therein corresponding to the number of pulses which it receives, a source of recurring clock pulses, means for coupling said source to said counters, output terminal means, means for effectively connecting said source to said output terminal means in response to an output pulse from the activated storage counter, and means for (a) disconnecting said source from said output terminal means, (b) stepping said commutating means and (c) producing a marker pulse at said output terminal means all in response to an output pulse from said reference counter so that groups of pulses appear at said output terminal means identical to the groups fed to the input terminal.

9. In a digital readout apparatus for producing a series of time spaced signals corresponding to a stored numerical value, the combination comprising a storage counter and a reference counter, each of said counters being of the type capable of storing a count and for producing an output pulse when a predetermined count is achieved, means for activating said storage counter initially to store a count not exceeding said predetermined count, means for conditioning said reference counter initially to store a count of zero, a source of recurring pulses, means for coupling said source to both of said counters, an output terminal, means for effectively connecting said source to said output terminal in response to an output pulse from said storage counter, means for disconnecting said source from said output terminal in response to an output pulse from said reference counter so that a total number of pulses is produced at the output terminal corresponding to the count initially stored in said storage counter, and inhibiting means interposed between said counters and said output terminal so that no output pulse is produced in the condition when the count initially stored in said storage counter is zero.

10. A device for digital storage and readout comprising, in combination, a plurality of storage counters representing successive numerical orders and a reference counter, storage counters being of the type capable of receiving and storing input pulses for production of an output pulse accompained by resetting when a predetermined count is achieved, means including an input terminal for receiving groups of pulses in timed sequence, commutating means controllably connected to said storage counters and rendered operative in response to the receipt of groups of pulses for activating said counters in succession synchronized with the arrival of the groups of pulses for storage of a group of pulses in each storage counter, means for connecting the storage counters together in a chain, means including an input terminal responsive to the receipt of a series of pulses to be registered order by order in said storage counter for rendering the storage counter connecting means operable and for connecting the input terminal to the storage counter of the lowest order, a source of recurring clock pulses, an output terminal, means including said commutating means for coupling said source to said counters, means for effectively connecting said source to said output terminal in response to an output pulse from the activated one of said storage counters, means for disconnecting said source from said output terminal as well as stepping said commutating means in response to an output pulse from said reference counter for producing at said output terminal groups of pulses corresponding to the count stored in the successively activated storage counters, means including said storage counter connecting means for connecting the storage counter of the lowest order to said source of clock pulses so that said counters are progressively filled and a second output terminal connected to the storage counter of the highest order whereat a pulse is produced when such counter is filled.

(References on following page)

References Cited by the Examiner

UNITED STATES PATENTS

| | | | |
|---|---|---|---|
| 2,401,621 | 6/46 | Desch et al. | 235—155 |
| 2,658,681 | 11/53 | Palmer et al. | 235—16 |
| 2,757,862 | 8/56 | Boyden et al. | 235—154 X |
| 2,767,908 | 10/56 | Thomas | 235—166 |
| 2,771,599 | 11/56 | Nolde et al. | 235—92 |
| 2,843,840 | 7/58 | Brinster et al. | 235—92 |
| 2,851,596 | 9/58 | Hilton | 235—92 |
| 2,872,110 | 2/59 | Snyder et al. | 235—92 |
| 2,927,313 | 3/60 | Dickinson | 340—347 |
| 2,973,899 | 3/61 | Hegner | 235—92 |
| 2,989,235 | 6/61 | Dickinson | 235—155 |
| 3,064,236 | 11/62 | Coleman | 340—164 |
| 3,064,889 | 11/62 | Hupp | 235—92 |
| 3,129,322 | 4/64 | Sarratt | 235—92 |

MALCOLM A. MORRISON, *Primary Examiner.*